March 6, 1956 B. H. SHINN 2,737,405
GASKET
Filed June 29, 1953

INVENTOR.
BYRON H. SHINN
BY Maurice H. Klitzman
and Wade Koontz
ATTORNEYS

United States Patent Office 2,737,405
Patented Mar. 6, 1956

2,737,405
GASKET

Byron H. Shinn, Bolton, Conn., assignor to the United States of America as represented by the Secretary of the Air Force Application June 29, 1953, Serial No. 364,773

1 Claim. (Cl. 288—24)

This invention relates to a gasket for sealing irregular shaped openings in engines.

From a manufacturer's standpoint, it is difficult to fabricate gaskets which are to be used in sealing engine components which require irregular shaped seals. It is, therefore, an object of this invention to provide an irregular shaped metal seal which is adapted to be fabricated by a very simple manufacturing process.

It is a further object of this invention to provide a gasket which is adapted to be used in an engine in which the gasket is constructed of three sheets of metal welded together, the three sheets being cut to the irregular shape of the opening.

It is still a further object of this invention to provide a metal gasket for engines which is adapted to be fabricated by cutting three sheets of metal to the irregular shape of the opening, while they are in a flat condition, welding them together, placing between the weld a suitable chemical, heating them at such a temperature that the gas entrapped therein will expand and provide a bulge in the gasket so that the expanded portions of the gasket have a certain amount of spring.

A still further object of this invention is to provide a metal gasket for engines in which three sheets of metal are adapted to be welded together, the middle sheet having spaced predetermined size openings for controlling the volume in the gasket. After the welding process the gasket is filled with a suitable chemical and heated to such an extent that the pressure therein will expand the metal.

It is a still further object of this invention to provide a metal gasket for engines comprised of three sheets of metal cut to an irregular size opening about which it is adapted to be used, the center metal sheet being perforated, the sheets then being welded while they are still flat, introducing a suitable chemical, then heating the gasket so that the entrapped gas therein will create a pressure so as to expand the metal between the welds, the perforations controlling the volume created by the expansion.

These and other objects will become more apparent when read in the light of the accompanying specification and drawing wherein.

Figure 1:
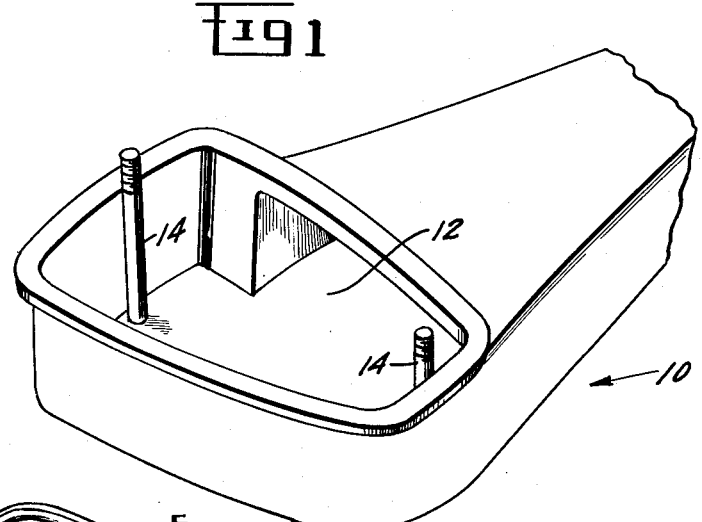
Fig. 1 shows a deicing L having an irregular shaped opening.
Figure 2:
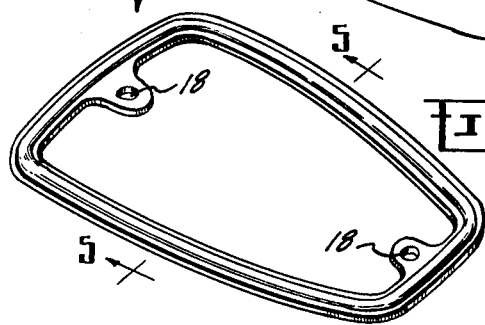
Fig. 2 is an isometric view of a gasket which is adapted to fit the opening of Fig. 1.
Figure 3:
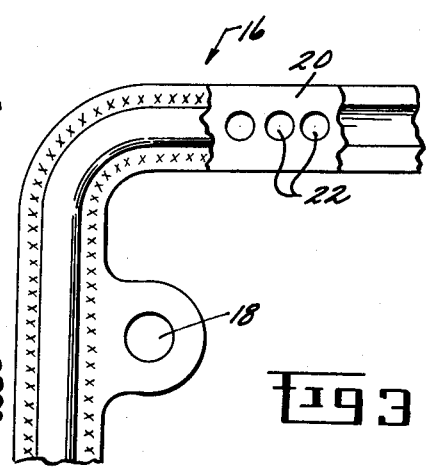
Fig. 3 is a partially broken view to show the openings in the spacer sheet of the gasket.
Figure 4:
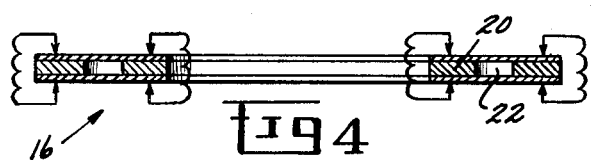
Fig. 4 is an enlarged cross-sectional view of the gasket before pressurizing.
Figure 5:
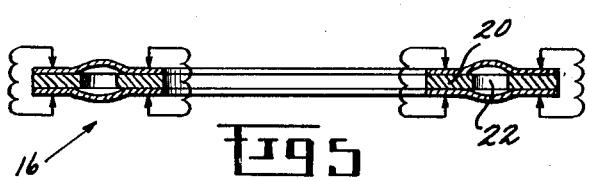
Fig. 5 is an enlarged cross-sectional view taken on line 5—5 of Fig. 2 after pressurizing.

Referring to the drawing, the numeral 10 generally designates a deicing L. The deicing L is provided with an irregular shaped opening 12 providing with upwardly extending studs 14 spaced inwardly of the margins of the opening. The numeral 16 generally designates a gasket which is constructed in accordance with this invention provided with openings 18 adapted to receive the studs 14 when placed over the margins of the opening. The gasket itself is fabricated by cutting three flat sheets of metal according to the size and shape of the irregular opening 12. The purpose of the center sheet 20 will be hereinafter explained more fully. The three sheets of metal are welded while in a flat condition to form a hermetic seal. The expansion or bulging of the outer sheets of metal is obtained by placing between the welds of the gasket a suitable chemical, which, upon being heated will produce a compressible gas. This chemical might be introduced in pill form to be heated after the welding operation or it might be injected through the wall of the gasket after the welding operation in which case liquid $CO_2$ would be a suitable chemical. Upon heating the gasket the entrapped gas in the openings 22 will expand the outer sheets of metal to a position such as shown in Figure 5 to form a sealing surface. The gasket is adapted to be used as a seal in this condition since the expanded metal has a springing action.

It is, therefore, readily seen that a very cheap and efficient gasket has been provided which can be very easily fabricated to fit any irregular shaped hole. Further, this seal eliminates the necessity of profiling a channel for each of the mating parts in which a seal is desired therebetween.

Although the specific apparatus embodying this invention has been shown and described, it will be understood that such a showing has been made in order that the invention may be more completely understood, such a showing is not to be considered as in any way limiting this invention. Many other types of apparatus may be used to carry out the invention as well as many modifications, additions and omissions from the particular apparatus shown and described.

What is claimed is:

A substantially flat gasket adapted to be used as a seal between two separable members, said gasket having a relatively large irregularly shaped opening therethrough, leaving a narrow continuous strip therearound, said gasket comprising a pair of sheet metal members of stretchable material and an intermediate similarly shaped sheet metal member conforming therewith, said intermediate member having a row of perforations closely spaced and completely inclosing said opening, said pair of sheet metal members being welded and hermetically sealed to opposite sides of said intermediate member and being bowed outwardly to form a continuous pressure chamber, said chamber containing a gas under pressure, the opposite sides of the pressure chamber forming seals.

References Cited in the file of this patent

UNITED STATES PATENTS

| | | |
|---|---|---|
| 344,349 | Clark | June 29, 1886 |
| 1,914,741 | Gysling | June 20, 1933 |
| 1,917,175 | Wills et al. | July 4, 1933 |

FOREIGN PATENTS

| | | |
|---|---|---|
| 489,053 | Great Britain | July 19, 1938 |
| 566,125 | Great Britain | Dec. 14, 1944 |